Figure 1:
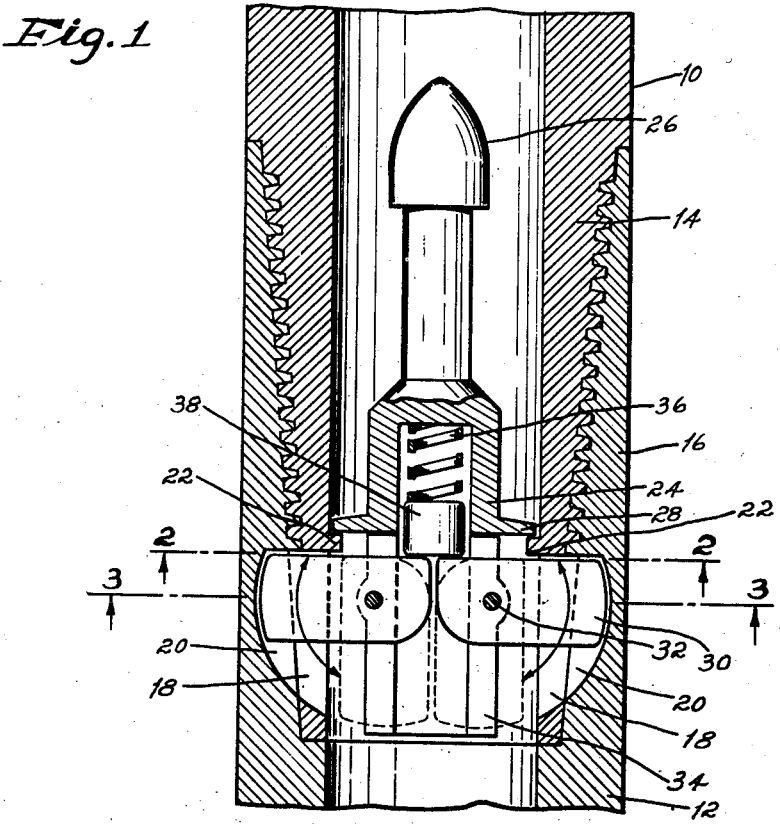

Jan. 3, 1950   J. A. BERMINGHAM, JR   2,493,521
COUPLING DEVICE
Filed June 20, 1946

INVENTOR.
J. A. BERMINGHAM, JR.
BY
ATTORNEY

Patented Jan. 3, 1950

2,493,521

UNITED STATES PATENT OFFICE 2,493,521

COUPLING DEVICE

James Allen Bermingham, Jr., Tulsa, Okla., assignor to The Texas Company, New York, N. Y., a corporation of Delaware Application June 20, 1946, Serial No. 678,001

5 Claims. (Cl. 285—170)

This invention relates to coupling devices and more particularly to a releasable coupling or safety joint adapted to be used in connection with a string of drill pipe, casing or tubing in well drilling or production. The principle object of the invention is the provision of such a device which can be located at any desired threaded connection or union in a string of pipe and which will positively lock that union so that there can be no relative movement between adjacent connected pipe sections but which can be readily unlocked or released from the surface whenever desired so that the pipe string can become uncoupled at the joint where the device is used.

In well drilling and production the sections of pipe or tubing are usually joined together by means of right hand threaded screw connection unions. In addition to drill bits various other tools or pieces of equipment are frequently attached to the lower end of a string of pipe or tubing such as well pumps, formation testers, perforated screens, liners and the like, and it frequently happens that for various reasons, such as the tool becoming stuck in the hole, it is necessary to disconnect the pipe or tubing from the tool, leaving the latter in the hole while the pipe is withdrawn. It is not uncommon to use a left hand threaded connection between the tool and the lower end of the pipe string so that in an emergency or whenever desired rotation of the pipe string in a right hand or clock-wise direction will disconnect the left hand threaded joint. Such joints often become loosened due to vibration or jarring of the pipe in the hole. Furthermore the left hand rotation of the pipe to make up the left hand threaded joint may cause loosening or uncoupling of the right hand threaded joints at one or more places in the pipe string.

In order to overcome these difficulties I have provided a coupling by means of which two adjacent pipe sections or one end of a pipe section and a tool or other article of equipment may be positively locked against relative rotational movement in either direction until or unless it is desired to disconnect the coupling. In accordance with the invention a coupling device is inserted preferably at a left hand threaded joint when the joint is made up, the coupling device having one or more lugs which engage corresponding recesses in the two pipe sections to be connected so that unthreading of the joint is impossible. To unlock the coupling the locking assembly is merely pulled upwardly and withdrawn from the previously locked joint as by means of a suitable grab run downwardly through the pipe string on a wire line or cable. As soon as the locking assembly has been retrieved the joint in the drill pipe tubing or casing may be easily unscrewed and disconnected by suitable rotation of the pipe string from the surface.

Figure 2:
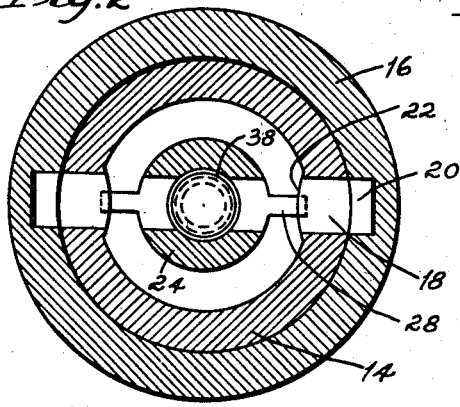
Figure 3:
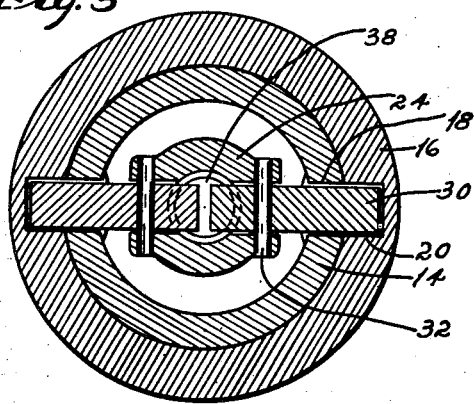

For a better understanding of the invention reference may be had to the accompanying drawing in which Figure 1 is a sectional elevation through a joint in which the releasable coupling is in locking position;

Figure 2 is a section of the line 2—2 of Figure 1 looking in the direction of the arrows and Figure 3 is a section on the line 3—3 of Figure 1.

Referring to the drawing, a pair of adjacent pipe sections 10 and 12 are shown in connected relation, the section 10 having a threaded pin portion 14 and the section 12 having a corresponding threaded box portion 16, the threads preferably being left hand, although this is not essential. The lower extremity of the pin 14 is provided with a pair of oppositely disposed slots 18 and the box 16 is provided with a pair of recesses 20 disposed so that when the threaded elements are made up or connected the slots 18 and the recesses 20 will coincide. The pin 14 is also provided on its inner surface just above the slots 18 with a pair of projections or shoulders 22 for a purpose which will be described hereinafter. If desired, a vertical orientation mark, not shown, may be provided on the outside of both pipe sections 10 and 12 at the joint and will aid in showing when the threaded connection is properly made up with the slots 18 and recesses 20 in alignment.

The locking device or unit comprises a substantially cylindrical elongated body member 24 provided at its upper end with a spearhead 26 of any suitable form and adapted to be engaged by a tool or grab while within the pipe string. The body member 24 is provided with a pair of oppositely disposed lugs or projections 28 adapted to seat upon the inwardly projecting lugs 22. A pair of arms or dogs 30 are pivoted as at 32 to the body member 24 and are disposed within slots 34 in the body member so that they extend outwardly as shown in Figure 1 or they may swing downwardly so as to be retracted within the lots 34 of the body member. A compression spring 36 is disposed within the body member 24 and serves to exert pressure upon a follower block 38 which presses against the inner ends of the dogs 30. The dogs are consequently biased by means of the spring 36 toward their outward or extended position, the outer ends of the dogs fitting within the slots 18 and recesses 20 in the pin and box portions 14 and 16 to prevent unthreading of the joint. When in the extended or locking position as shown in Figure 1 the outer ends of the dogs 30 press upwardly thereby pulling the lugs 28 against the projections 22 whereby the device is held in locking position.

In operation, the two pipe sections 10 and 12 are screwed together, and the locking device, with the dogs 30 squeezed together in their retracted position, is inserted into the pipe 10 through its upper end by means of a suitable rod or other device engaging the spearhead 26. The device is then pushed through the pipe section 10 to the threaded union and then turned if necessary so that the lugs 28 will seat upon the shoulders 22 and the dogs 30 will, due to the pressure of the spring 36, extend themselves into the recesses 18—20 in locking position. The rod used to place the device in position is then removed and the rest of the pipe string made up in the usual manner. Assuming that it is desired to disconnect the pipe string between the sections 10 and 12 it is merely necessary to lower a conventional spear type grab on a wire line through the string to engage the spearhead 26 of the locking device which can then be withdrawn from the pipe string merely by pulling upwardly on the wire line.

An example of a possible application of the locking device which has been described is that of a coupling whereby a string of tubing or a wash pipe is attached within and to the lower end of a perforated liner or screen to be gravel packed. In the U. S. Letters Patent to Davis et al., No. 2,198,573 granted April 23, 1940, an apparatus for use in gravel packing wells by reverse circulation is disclosed. As is shown and described in that patent a string of tubing is run downwardly through a perforated liner and is attached to a plate at the lower end of the liner by means of a left hand threaded joint. The gravel in a carrier fluid is forced down through the space between the tubing string and the casing, the gravel being deposited in a cavity surrounding the perforated liner and the carrier fluid passing inwardly through the lower end of the liner and then upwardly through the tubing string to the surface. After sufficient gravel has been placed, it is necessary to remove the tubing string by disconnecting it from the liner. The locking device which has been described could be used in the left hand threaded joint between the tubing string and the perforated liner and would prevent the uncoupling or loosening of this joint prior to the time it is desired to remove the tubing string from the well.

It is to be understood that instead of providing sections of a drill pipe, casing or tubing string with the slots 18, recesses 20, and left hand threads as shown in Figure 1, a pair of subs can be made up and then connected at any desired place in a pipe string such as above a formation tester, pump, liner or the like. The locking assembly will not materially restrict the flow of drill fluid through the pipe and any pressure drop through the device will be negligible. Due to the engagement between the lugs 28 and shoulders 22, the locking device will be prevented from moving downwardly and out of position by the downward force of direct circulation through the pipe string.

Obviously many modifications and variations of the invention, as hereinbefore set forth, may be made without departing from the spirit and scope thereof, but only such limitations should be imposed as are indicated in the appended claims.

I claim:

1. A device for positively locking a joint between two pipe members having overlapping threaded portions provided with recesses adapted to coincide when the joint is made up, comprising a body member adapted to be inserted lengthwise through said pipe to a point opposite the threaded portions of the pipe members, an arm pivoted to said body member and adapted to swing laterally thereof into the space formed by said recesses so as to lock said pipe members against unthreading, resilient means for normally biasing said arm to its lateral locking position and means on said body member whereby the device can be engaged and pulled from the pipe to unlock the joint, said arm being pulled inwardly out of said recesses against the action of said resilient means.

2. A locking device for a coupling between the ends of a pair of pipes provided with inside and outside cooperating threaded portions adapted to be connected in overlapping relation, comprising a body member adapted to be inserted longitudinally in the pipes opposite said connection, an arm pivoted to said body member and capable of being swung at right angles to said member and to be retracted within said member, the overlapping portions of said pipes being provided with recesses adapted to be disposed in alignment when the threaded connection is made up, said arm being of sufficient length to fit within said aligned recesses in locking position to prevent unthreading of said connection, means in said body member for forcing said arm into its extended locking position within said recesses and means for withdrawing said device from its locking position and from said pipes to permit disconnecting said coupling.

3. A device for positively locking a joint between two pipe members having overlapping threaded portions provided with recesses adapted to coincide when the joint is made up, comprising an elongated body member adapted to be inserted through the pipe to a position opposite the threaded portions of the pipe members, said body member having a longitudinal slot, an arm pivoted to said body member within said slot and adapted to swing laterally thereof into the space formed by said recesses, resilient means for normally biasing said arm to its lateral extended position and means on said body member whereby the device can be engaged and pulled from the pipe to unlock the joint, the extended end of said arm being forced inwardly out of said recesses and into said slot against the action of said resilient means.

4. A locking device for a coupling between the ends of a pair of pipes provided with overlapping cooperating threaded portions, comprising an elongated body member adapted to be inserted in the pipes to a point opposite said connection, a pair of laterally projecting lugs on said body member, a pair of inwardly projecting shoulders on one of said pipes adapted to be engaged by said lugs to hold said body member at said point, an arm pivoted to said body member and capable of being swung laterally of said member and to be retracted within said member, the overlapping portions of said pipes being provided with recesses adapted to be disposed in alignment when the threaded connection is made up, said arm being of sufficient length when in its lateral position to fit within said aligned recesses to lock and prevent unthreading of said connection, means in said body member for forcing said arm into its extended lateral position within said recesses and means for withdrawing said device from its locking position and from pipes to permit disconnecting said coupling.

5. A device for locking a threaded connection between two coaxial pipe sections comprising a body member adapted to be inserted in a pipe at a predetermined point opposite said connection, said body member having a longitudinal opening, means for holding said body member at said point, a plurality of arms pivoted to said body member within said opening and adapted to be swung from a retracted position within the body member to an extended position at right angles to said body member, spring means within said body member for biasing said arms toward their extended position, the overlapping threaded ends of said pipe sections being provided with recesses coinciding in registering relation when the connection is made up, the outer portions of said arms being accommodated when in their extended lateral position within said recesses to lock the connection against unthreading, and means for withdrawing the device from said pipe sections to permit the unthreading of said connection.

JAMES ALLEN BERMINGHAM, JR.

REFERENCES CITED

The following references are of record in the file of this patent:

UNITED STATES PATENTS

| Number | Name | Date |
|---|---|---|
| 1,189,802 | Eckert | July 4, 1916 |
| 2,111,859 | Kennedy | Mar. 22, 1938 |
| 2,153,812 | Newton | Apr. 11, 1939 |